(12) United States Patent
Chakrabarti et al.

(10) Patent No.: US 10,152,350 B2
(45) Date of Patent: Dec. 11, 2018

(54) SECURE DOMAIN MANAGER

(71) Applicant: Intel Corporation, Santa Clara, CA (US)

(72) Inventors: Somnath Chakrabarti, Portland, OR (US); Mona Vij, Hillsboro, OR (US); Carlos V. Rozas, Portland, OR (US); Brandon Baker, Portland, OR (US); Vincent R. Scarlata, Beaverton, OR (US); Francis X. McKeen, Portland, OR (US); Simon P. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 15/200,820

(22) Filed: Jul. 1, 2016

(65) Prior Publication Data
US 2018/0007023 A1    Jan. 4, 2018

(51) Int. Cl.
*H04L 29/06*    (2006.01)
*G06F 21/00*    (2013.01)
*G06F 9/48*    (2006.01)
*H04L 9/08*    (2006.01)

(52) U.S. Cl.
CPC .......... *G06F 9/4856* (2013.01); *H04L 9/0819* (2013.01); *H04L 9/0894* (2013.01); *H04L 63/10* (2013.01); *H04L 63/20* (2013.01); *H04L 2463/062* (2013.01)

(58) Field of Classification Search
CPC ... H04L 63/062; H04L 9/0894; H04L 63/126; H04L 9/0819; H04L 2463/062; G06F 9/4856
See application file for complete search history.

(56) References Cited

U.S. PATENT DOCUMENTS

| | | | | |
|---|---|---|---|---|
| 5,276,735 A * | 1/1994 | Boebert | .............. | G06F 12/1408 380/277 |
| 9,584,517 B1 * | 2/2017 | Roth | ..................... | H04L 63/10 |
| 9,697,371 B1 * | 7/2017 | Willden | ................. | G06F 21/62 |
| 2012/0297200 A1 * | 11/2012 | Thom | .................... | G06F 21/57 713/189 |
| 2013/0347064 A1 * | 12/2013 | Aissi | ...................... | G06F 21/30 726/2 |
| 2014/0250511 A1 * | 9/2014 | Kendall | ............. | H04L 63/0815 726/6 |
| 2014/0289808 A1 * | 9/2014 | Blanke | .................. | G06Q 20/42 726/4 |
| 2014/0359047 A1 * | 12/2014 | Lee | ..................... | H04L 67/2852 709/213 |
| 2015/0294117 A1 * | 10/2015 | Cucinotta | ............... | G06F 21/74 713/189 |
| 2016/0037196 A1 * | 2/2016 | Peters | ................ | H04N 7/17318 725/31 |

(Continued)

*Primary Examiner* — Lisa C Lewis
(74) *Attorney, Agent, or Firm* — Patent Capital Group

(57) ABSTRACT

Particular embodiments described herein provide for an electronic device that can be configured to determine that a secure domain has been created on a device, where keys are required to access the secure domain, obtain the keys that are required to access the secure domain from a network element, and encrypt the keys and store the encrypted keys on the device. In an example, only the secure domain can decrypt the encrypted keys and the device is a virtual machine.

17 Claims, 8 Drawing Sheets

(56) References Cited

U.S. PATENT DOCUMENTS

| | | | |
|---|---|---|---|
| 2016/0103675 A1* | 4/2016 | Aabye | G06F 8/65 |
| | | | 717/170 |
| 2016/0254904 A1* | 9/2016 | Hjelm | H04L 9/006 |
| | | | 713/155 |
| 2017/0054557 A1* | 2/2017 | Rozas | H04L 9/0891 |
| 2017/0132430 A1* | 5/2017 | Sikka | G06F 21/6245 |
| 2017/0134396 A1* | 5/2017 | Bhargav-Spantzel | |
| | | | H04L 63/123 |
| 2017/0180993 A1* | 6/2017 | Kelly | H04W 12/08 |
| 2017/0185540 A1* | 6/2017 | Poornachandran | G06F 13/102 |
| 2017/0289185 A1* | 10/2017 | Mandyam | H04L 63/1425 |
| 2018/0046823 A1* | 2/2018 | Durham | G06F 21/6245 |

* cited by examiner

SECURE DOMAIN MANAGER

TECHNICAL FIELD

This disclosure relates in general to the field of information security, and more particularly, to a secure domain manager.

BACKGROUND

The field of network security has become increasingly important in today's society. In particular, a cloud network can provide a medium for exchanging data between different devices connected to different computer networks. While the use of a network has transformed business and personal communications, it has also been used as a vehicle for malicious operators to gain unauthorized access to computers and computer networks and for intentional or inadvertent disclosure of sensitive information.

In a cloud computing system, confidential information is stored, transmitted, and used by many different information processing systems. Techniques have been developed to provide for the secure handling and storing of confidential information. These techniques include various approaches to creating and maintaining a secured, protected, or isolated partition or environment within an information processing system. However, some of these techniques do not address the issue of a secure domain manager. What is needed is system that can secure a domain manager.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for device pairing in a local network. Features such as structure(s), function(s), and/or characteristic(s), for example, are described with reference to one embodiment as a matter of convenience; various embodiments may be implemented with any suitable one or more of the described features.

Figure 1:
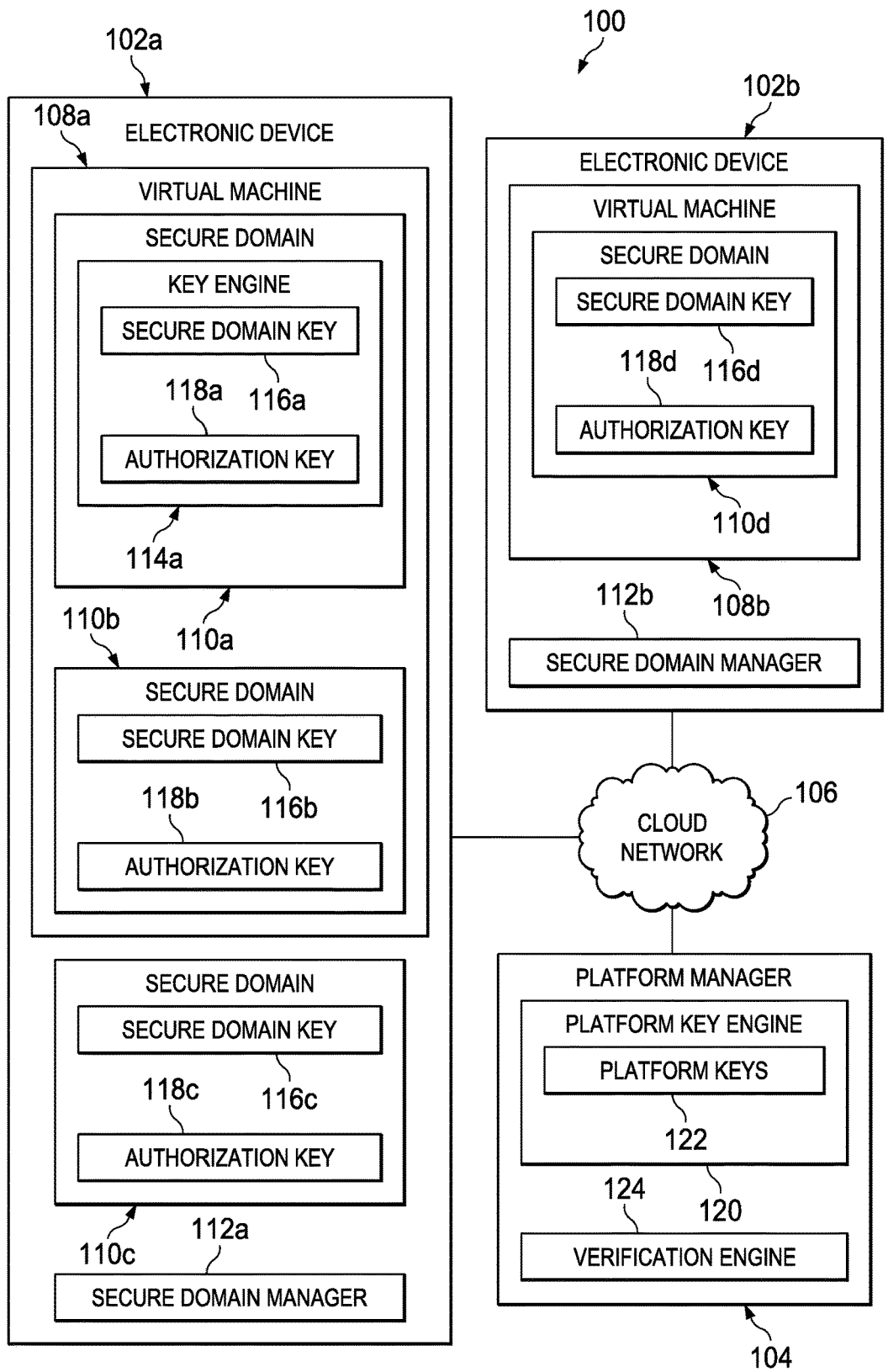
FIG. 1 is a simplified block diagram of a communication system for a secure domain manager in accordance with an embodiment of the present disclosure.

FIG. 1 is a simplified block diagram of a communication system 100 for a secure domain manager in accordance with an embodiment of the present disclosure. Communication system 100 can include one or more electronic devices 102a and 102b, and a platform manager 104. Electronic devices 102a and 102b and platform manager 104 can be in communication using cloud network 106. In an example, communication system 100 is a portion of a cloud computing system.

Electronic device 102a can include a virtual machine 108a, a secure domain 110c, and a secure domain manager 112a. Virtual machine 108a can include one or more secure domains 110a and 110b. Secure domain 110a can include a key engine 114a. Key engine 114a can include a secure domain key 116a and an authorization key 118a. Secure domain 110b can include a secure domain key 116b and an authorization key 118b. Secure domain 110c can include a secure domain key 116c and an authorization key 118c. Electronic device 102b can include a virtual machine 108b and a secure domain manager 112b. Virtual machine 108b can include secure domain 110d. Secure domain 110d can include a secure domain key 116d and an authorization key 118d. Platform manager 104 can include a platform key engine 120 and a verification engine 124. Platform key engine 120 can include platform keys 122.

In an example, virtual machine 108a may be a virtual machine on electronic device 102a and virtual machine 108b may be a virtual machine on electronic device 102b. Secure domains 110a, 110b, 110c, and 110d may each be a secure domain such as an enclave, trusted execution environment, etc. Key engine 114a can be configured to obtain the key that allows access to secure domain 110a. Secure domain manager 112a and 112b can each be configured to manage one or more domains. Also, secure domain manager 112a and 112b can each function as a key engine and obtain a key that allows access to a specific domain. Platform key engine 120 can be configured to manage keys that have been assigned on the platform. Verification engine 124 can be configured to verify that a device is what the device is claiming to be or to verify that a specific secure domain should be created or transferred to a specific device.

Elements of FIG. 1 may be coupled to one another through one or more interfaces employing any suitable connections (wired or wireless), which provide viable pathways for network (e.g., cloud network 106) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In an example, communication system 100 can be configured to include a system that allows for a secure domain manager. In an illustrative example, a secure domain manager can be configured to determine that a secure domain has been created on a device, where keys are required to access the secure domain, obtain the keys that are required to access the secure domain from a network element, and encrypt the keys and store the encrypted keys on the device. The device may be a virtual device and only the secure domain can decrypt the encrypted keys in a specific example, access to one or more secure domains are kept in a key store. The access to each of the one or more secure domains can be tied to platform keys and a local device (e.g., key engine 114a) can provide local key management. In addition, a secure domain manager (e.g., secure domain manager 112a) can manage access to each secure domain (e.g., secure domains 110a-110c) on a device and can allow for migration of each secure domain to a new electronic device (e.g., from electronic device 102a to electronic device 102b) or to a different virtual machine on the same device.

For purposes of illustrating certain example techniques of communication system 100, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is using a network, especially using a cloud based network computing system. Cloud networking is a new networking paradigm for building and managing secure private networks over the public Internet by utilizing global cloud computing infrastructure. In cloud networking, traditional network functions and services including connectivity, security, management and control, are pushed to the cloud and delivered as a service. Cloud-based networks only require an Internet connection and work over any physical infrastructure, wired or wireless, public or private. One of the elements of a cloud system is a cloud manager. The cloud manager can control access to secure domains on a device (either a virtual device or a physical device) and can help facilitate migration of a secure domain from one device to another device. What is needed is a system that can be configured to help secure the cloud manager and to provide for a secure domain manager.

A communication system that includes a secure domain manager, as outlined in FIG. 1, can resolve these issues (and others). In an example, a platform manager (e.g., platform manager 104) can create a virtual machine and assign a secure domain to the virtual machine. A key engine (e.g., key engine 114a) can obtain keys to access the secure domain (e.g., secure domain 110a). In an example, the key engine can verify that the electronic device and the virtual machine are valid and can be issued access to the secure domain. In another example, communication system 100 can allow for a secure virtual migration of a virtual machine. In a specific example of communication system 100, a secure domain manager (e.g., secure domain manager 112a) can communicate with the platform manager and verification engine (e.g., verification engine 124) and verify that a target destination for the secure domain is valid. In addition, a destination or target secure domain manager (e.g., secure domain manager 112b) can communicate with the platform manager and verification engine and verify that the sending electronic device and the sending virtual machine are valid. Then the secure domain managers can communicate with each other and create a secure channel. The secure channel can be used to transfer a secure domain (e.g., secure domain 110a) and the authentication or the keys (secure domain key 116a and authorization key 118a) to access the secure domain.

In an example, during the transfer of the secure domain, the secure domain manager can use a management stack to transfer the untrusted states from the virtual machine to the destination or target device. In another example, during the transfer of the secure domain, the management stack can transfer the untrusted state to the destination or target device and the secure domain manager can use the management stack to transfer the trusted states in an encrypted form. In both examples, execution can stop and the secure domain and access to the secure domain can be transferred to the destination or target device. It should be noted that the access (e.g., secure domain key 116a and authorization key 118a) may be used on only one device to help prevent against malicious attacks.

In an embodiment, a secure domain key (e.g., secure domain key 116a) is received from a cloud element (e.g., platform manager 104 using platform key engine 120). The secure domain key can be sealed or encrypted by a secure domain manager using an authorization key (e.g., authorization key 118a) that is stored locally. The authorization key can be used to decrypt the secure domain key and allow access to the secure domain. Using this approach, when secure domain is no longer operating and reboots or starts up again, the secure domain key can be retrieved locally instead of needing to be obtained from a cloud element. In addition, when the secure domain is migrated or transferred to a new device, the authorization to access the secure domain can be migrated or transferred with with secure domain.

Turning to the infrastructure of FIG. 1, communication system 100 in accordance with an example embodiment is shown. Generally, communication system 100 can be implemented in any type or topology of networks. Cloud network 106 represent a series of points or nodes of interconnected communication paths for receiving and transmitting packets of information that propagate through communication system 100. Cloud network 106 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a and 102b and platform manager 104 are cloud network elements, which are meant to encompass network appliances, servers (both virtual and physical), routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a and 102b and platform manager 104 can include memory elements for storing information to be used in the operations outlined herein. Each of electronic devices 102a and 102b and platform manager 104 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic devices 102a and 102b and platform manager 104 may include software modules (e.g., key engine 114a, platform key engine 120, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a and 102b and platform manager 104 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a and 102b can be a network elements and include, for example, servers, desktop computers, or other similar devices that may be used in a cloud services architecture. Cloud services may generally be defined as the use of computing resources that are delivered as a service over a network, such as the Internet. The services may be distributed and separated to provide required support for user devices. Typically, compute, storage, and network resources are offered in a cloud infrastructure, effectively shifting the workload from a local network to the cloud network. A server can be a network element such as a server or virtual server and can be associated with clients, customers, endpoints, or end users wishing to initiate a communication in communication system 100a via some network. The term 'server' is inclusive of devices used to serve the requests of clients and/or perform some computational task on behalf of clients within communication systems 100.

Figure 2:
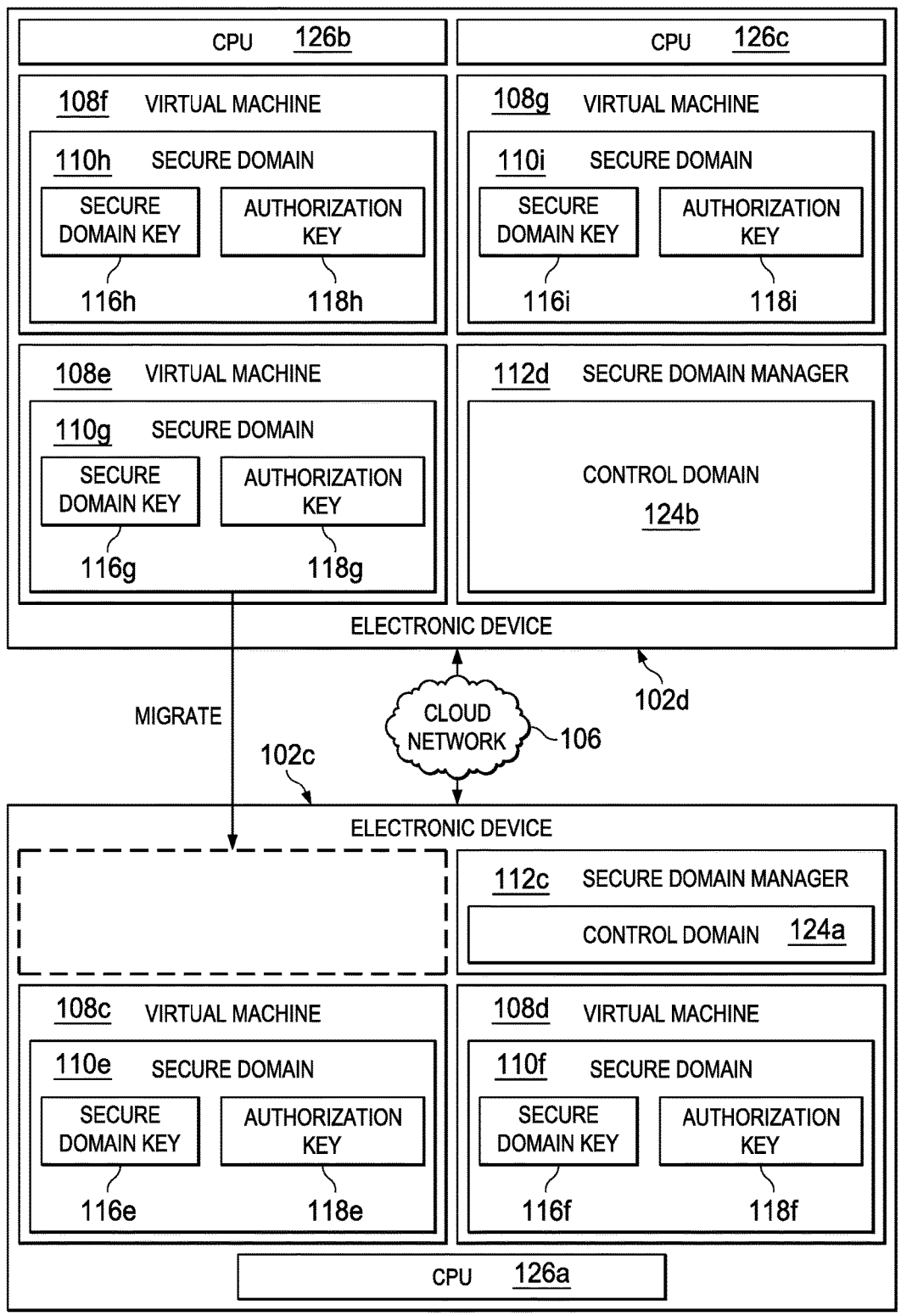
FIG. 2 is a simplified block diagram of an example of a communication system for a secure domain manager in accordance with an embodiment of the present disclosure.

Turning to FIG. 2, FIG. 2 is a simplified block diagram of a communication system including a secure domain manager in accordance with an embodiment of the present disclosure. Electronic device 102c can include one or more virtual machines 108c and 108d, a secure domain manager 112c, and a computer processing unit (CPU) 126a. Virtual machine 108c can include a secure domain 110e and virtual machine 108d can include a secure domain 110f. Secure domain 110e can include secure domain key 116e and authorization key 118e. Secure domain 110f can include secure domain key 116f and authorization key 118f. Secure domain manager 112c can include a control domain 124a. Electronic device 102d can include one or more virtual machines 108e-108g, a secure domain manager 112d, and one or more CPUs 126b and 126c. Virtual machine 108e can include a secure domain 110g, virtual machine 108f can include a secure domain 110h, and virtual machine 108g can include a secure domain 110i. Secure domain 110g can include secure domain key 116g and authorization key 114g. Secure domain 110h can include secure domain key 116h and authorization key 118*h*. Secure domain 110*i* can include secure domain key 116*i* and authorization key 118*i*. Secure domain manager 112*d* can include a control domain 124*b*.

When a new secure domain is set up, keys to the domain can be requested from a cloud network element. The received keys to the secure domain can be encrypted and stored locally so the keys do not need to be requested from the cloud network element again. For example, when secure domain 110*g* was created in virtual machine 108*e*, secure domain key 116*g* was requested and received from a cloud network element such as platform manager 104 (shown in FIG. 1). Secure domain key 116*g* can be encrypted using authorization key 114*a* and stored in secure domain 110*g*, another secure location in virtual machine 108*e*, in CPU 126*b* or 126*c*, or some other local secure location in electronic device 102*d*.

If secure domain 110*g* is to be migrated to electronic device 102*c*, speculative copies of unmodified pages (e.g., evolved packet core (EPC) pages) can be sent to electronic device 102*c* before suspending execution of virtual machine 108*e*. Once the speculative copies of the unmodified pages have been received by electronic device 102*c*, suspension of virtual machine 108*e* can occur and secure domain 110*g* can be migrated to electronic device 102*c* along with secure domain key 116*g* and authorization key 118*g* to facilitate access to secure domain 110*g*.

Figure 3:
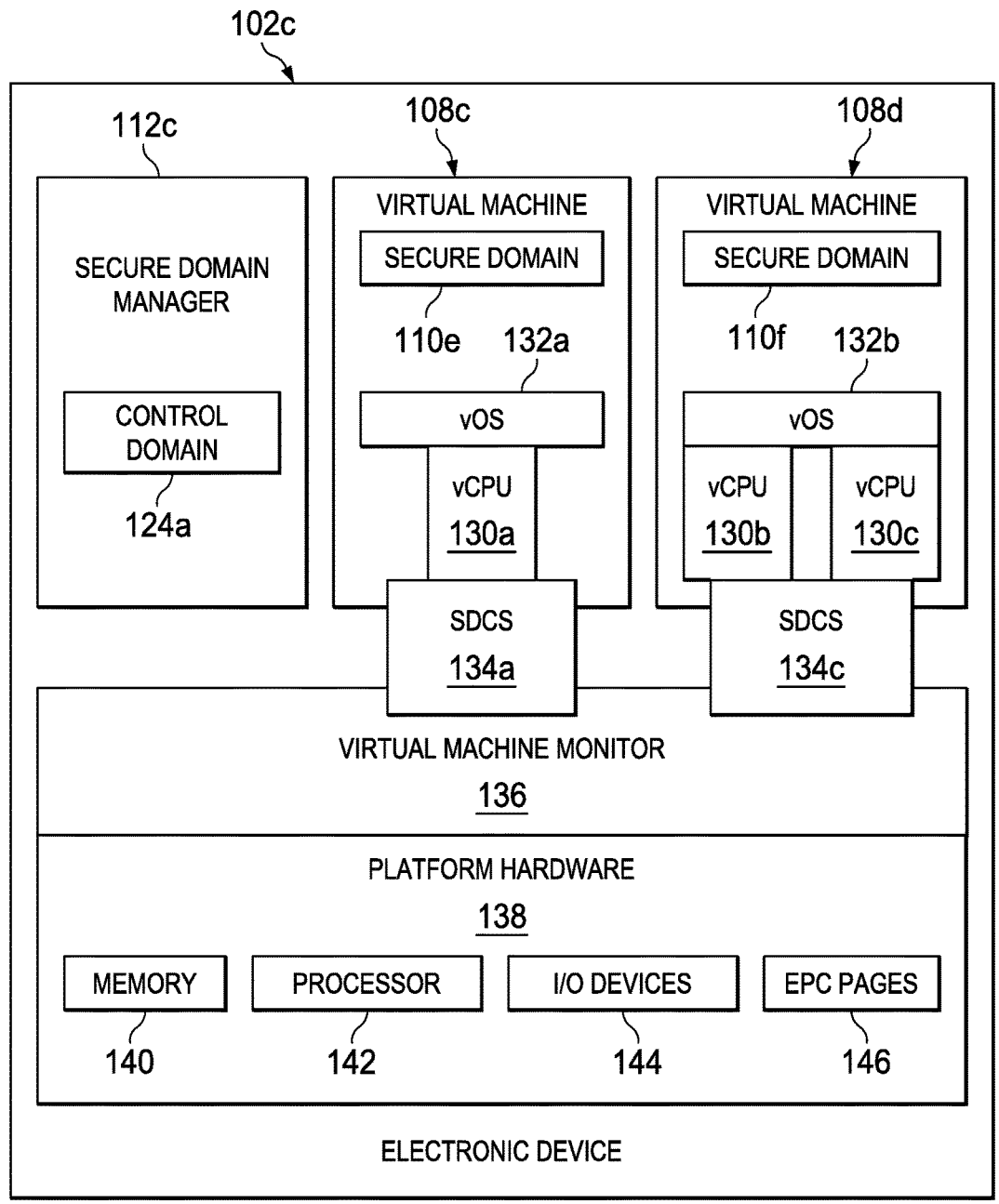
FIG. 3 is a simplified block diagram of an example of a communication system for a secure domain manager in accordance with an embodiment of the present disclosure.

Turning to FIG. 3, FIG. 3 is a simplified block diagram of a communication system including a secure domain manager in accordance with an embodiment of the present disclosure. Electronic device 102*c* can include virtual machines 108*c* and 108*d*, secure domain manager 112*c*, and virtual machine monitor 136. Virtual machine 108*c* can include secure domain 110*e*, an operating system 132*a*, and a virtual CPU 130*a*. Virtual machine 108*d* can include secure domain 110*f*, a virtual operating system 132*b*, and one or more virtual CPUs 130*b* and 130*c*. Virtual machine monitor 136 can include platform hardware 138. Platform hardware can include memory 140, a physical processor 142, input/output devices 144, and EPC pages 146.

In a specific example, software guard extensions (SGX) domain control structures (SDCS) 134*a* can couple virtual machine 108*c* to virtual machine monitor 136 and can be configured to provide a data structure for holding keys and other SGX domain states related to virtual machine 108*c* and secure domain 110*e*. SDCS 134*b* can couple virtual machine 108*d* to virtual machine monitor 136 and can be configured to provide a data structure for holding keys and other SGX domain states related to virtual machine 108*d* and secure domain 110*e*.

SDCS 134*a* and 134*b* can provide a mechanism for helping to prevent writes to EPC pages 146 and associated metadata. In an example, to prevent replay during migration, contents of EPC pages can be marked as read only or write protected. In a specific example, contents a new write protect (WP) bit (in EPC memory) can help ensure that the contents of the EPC pages do not diverge from a speculative copy.

Figure 4:
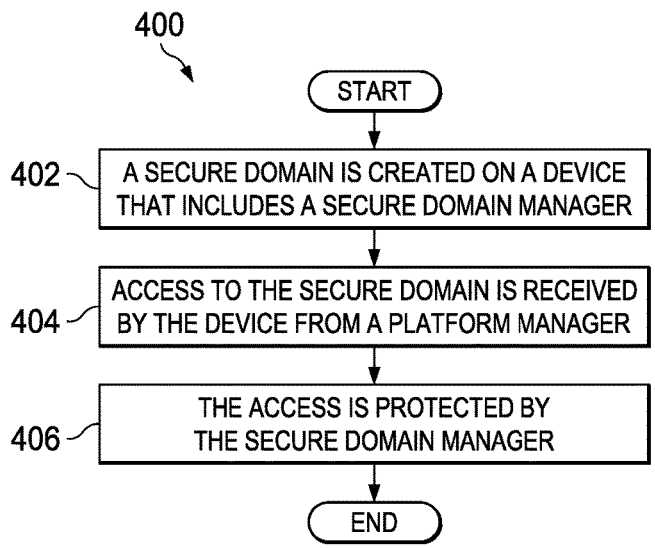
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with a secure domain manager, in accordance with an embodiment. In an embodiment, one or more operations of flow 400 may be performed by one or more of key engine 114*a*, secure domain manager 112*a* or 112*b*, platform key engine 120, and verification engine 124. At 402, a secure domain is created on a device that includes a secure domain manager. At 404, access to the secure domain is received by the device from a platform manager. At 406, the access (to the secure domain) is protected by the secure domain manager. For example, secure domain manager 112 may encrypt a secure domain key 116*a* using an authorization key 114*a*.

Figure 5:
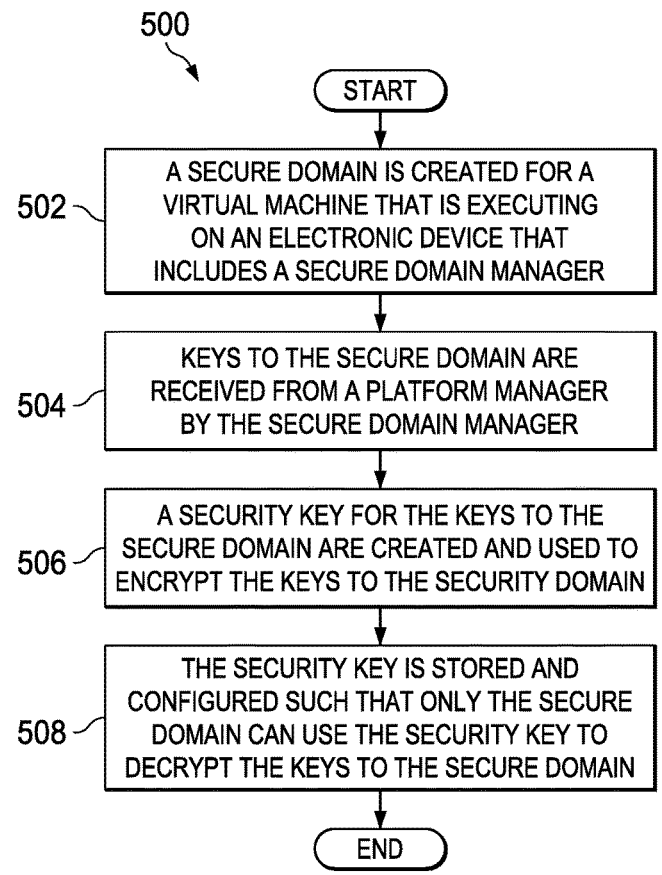
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with a secure domain manager, in accordance with an embodiment. In an embodiment, one or more operations of flow 500 may be performed by one or more of key engine 114*a*, secure domain manager 112*a* or 112*b*, platform key engine 120, and verification engine 124. At 502, a secure domain is created for a virtual machine that is executing on an electronic device that includes a secure domain manager. At 504, keys (or access) to the secure domain are received from a platform manager by the secure domain manager. At 506, a security key for the keys to the secure domain are created and used to encrypt the keys to the security domain. At 508, the security key is stored and configured such that only the secure domain can use the security key to decrypt the keys to the secure domain. For example, the security key may be configured to be machine specific such that if another machine with different parameters tried to use the security key, the security key would not allow access to secure domain.

Figure 6:
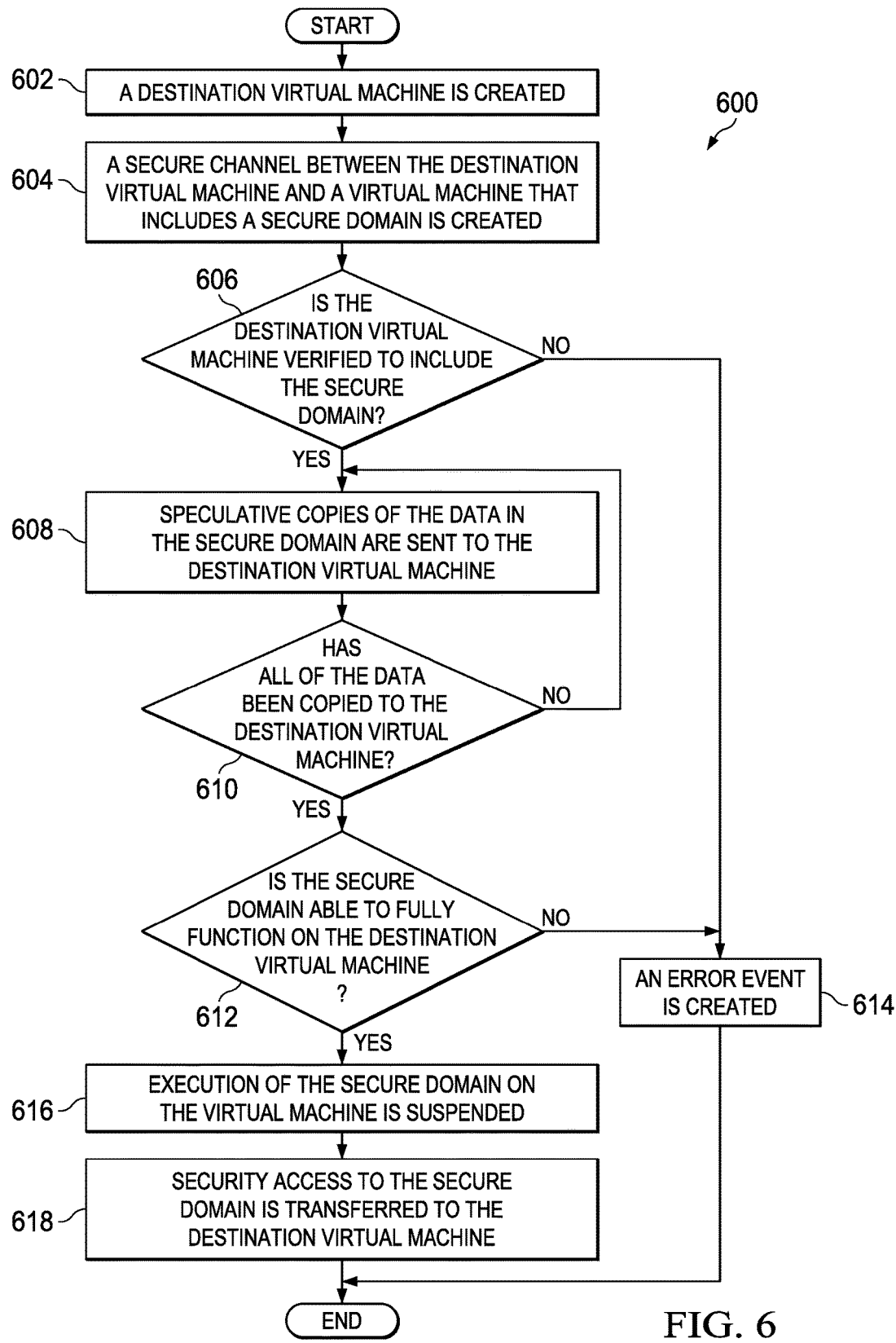
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with a secure domain manager, in accordance with an embodiment. In an embodiment, one or more operations of flow 600 may be performed by one or more of key engine 114*a*, secure domain manager 112*a* or 112*b*, platform key engine 120, and verification engine 124. At 602, a destination virtual machine is created. At 604, a secure channel between the destination virtual machine and a virtual machine that includes a secure domain is created. At 606, the system determines if the destination virtual machine is verified to include (or accept) the secure domain. If the destination machine is not verified to include the secure domain, then an error event is created, as in 614. The error event could be a security event indicating the potential presence of malware or some malicious system trying to access the secure domain.

If the destination machine is verified, then speculative copies of the data in the secure domain are sent to the destination virtual machine, as in 608. The speculative copies of the data can include unsecured EPC pages. In another example, the speculative copies of EPC pages are stored and transferred in encrypted form involving insecure memory/channel. At 610, the system determines if all the data has been copied to the destination virtual machine. If all of the data has not been copied to the destination virtual machine, then the system returns to 608 and speculative copies of the data in the secure domain are sent to the destination virtual machine. If all of the data has been copied to the destination virtual machine, then the system determines if the secure domain is able to fully function on the destination virtual machine, as in 612. If the secure domain is not able to fully function on the virtual machine, then an error event is crated, as in 614. If the secure domain is able to fully function on the virtual machine, then execution of the secure domain on the virtual machine is suspended, as in 616. At 618, security access to the secure domain is transferred to the destination machine.

Figure 7:
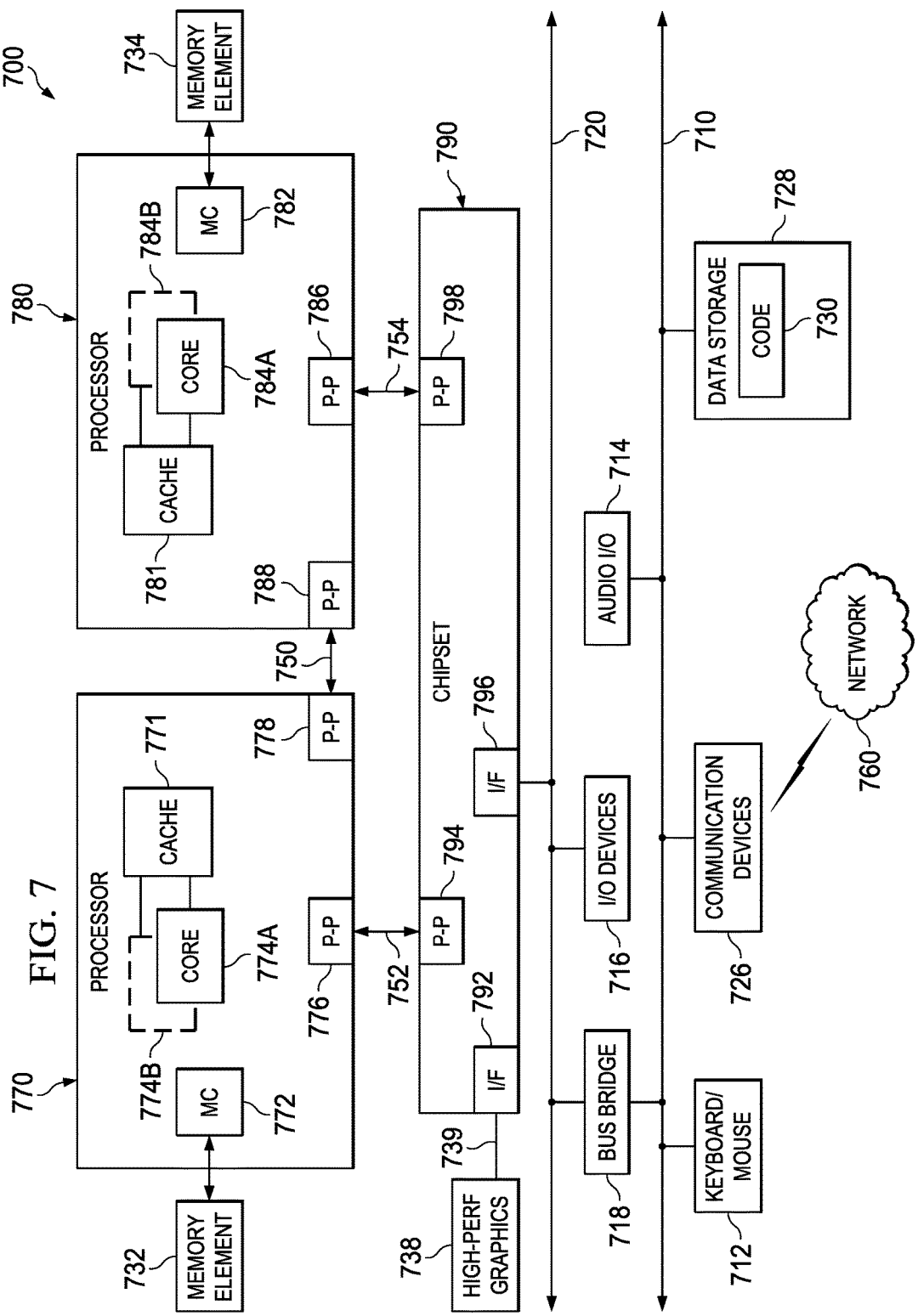
FIG. 7 is a block diagram illustrating an example computing system that is arranged in a point-to-point configuration in accordance with an embodiment.

Turning to FIG. 7, FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces.

Generally, one or more of the network elements of communication system 100 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 1-5. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor and may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
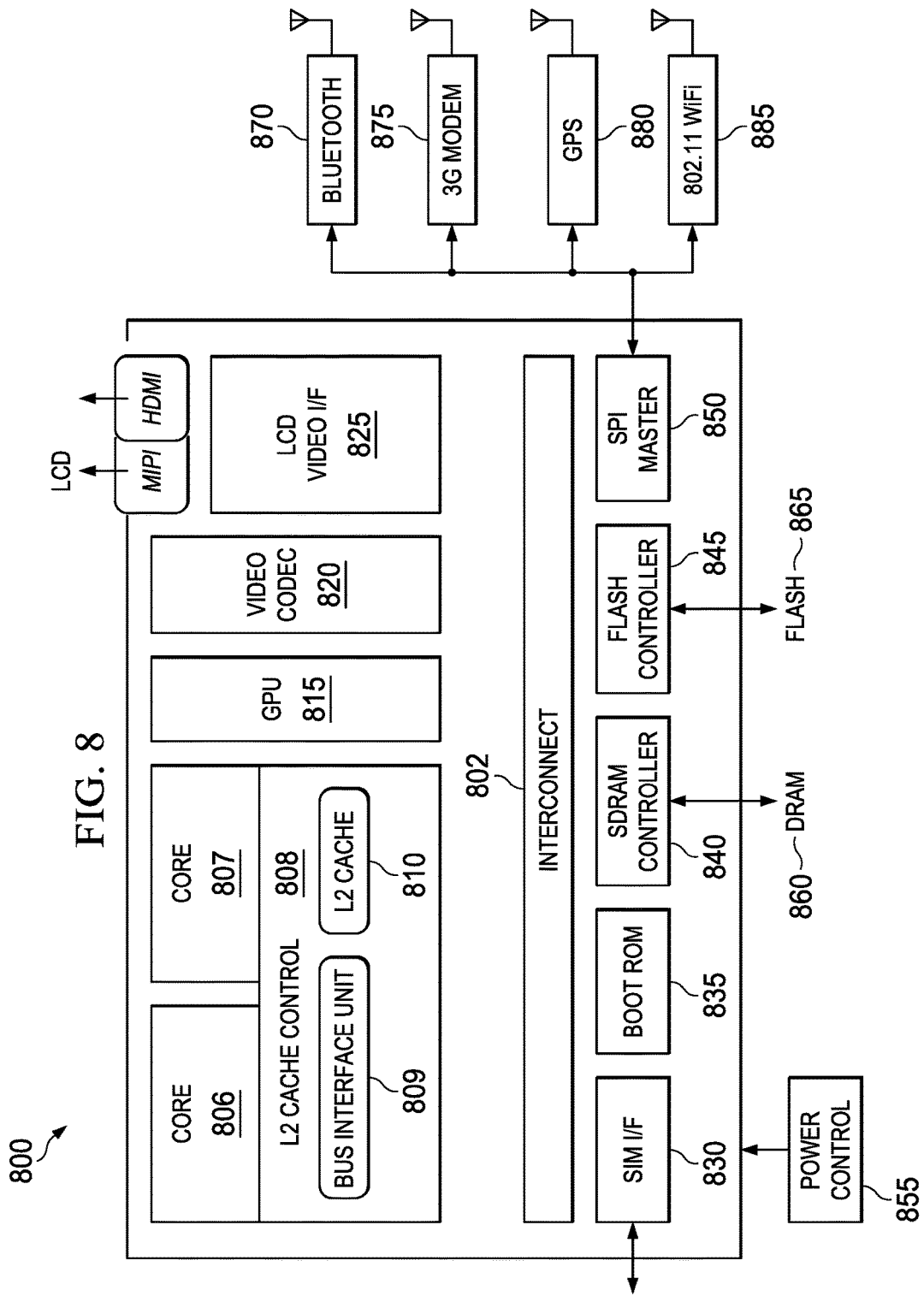
FIG. 8 is a simplified block diagram associated with an example ecosystem system on chip (SOC) of the present disclosure.

Turning to FIG. 8, FIG. 8 is a simplified block diagram associated with an example ecosystem SOC 800 of the present disclosure. At least one example implementation of the present disclosure can include the device pairing in a local network features discussed herein. Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

Ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
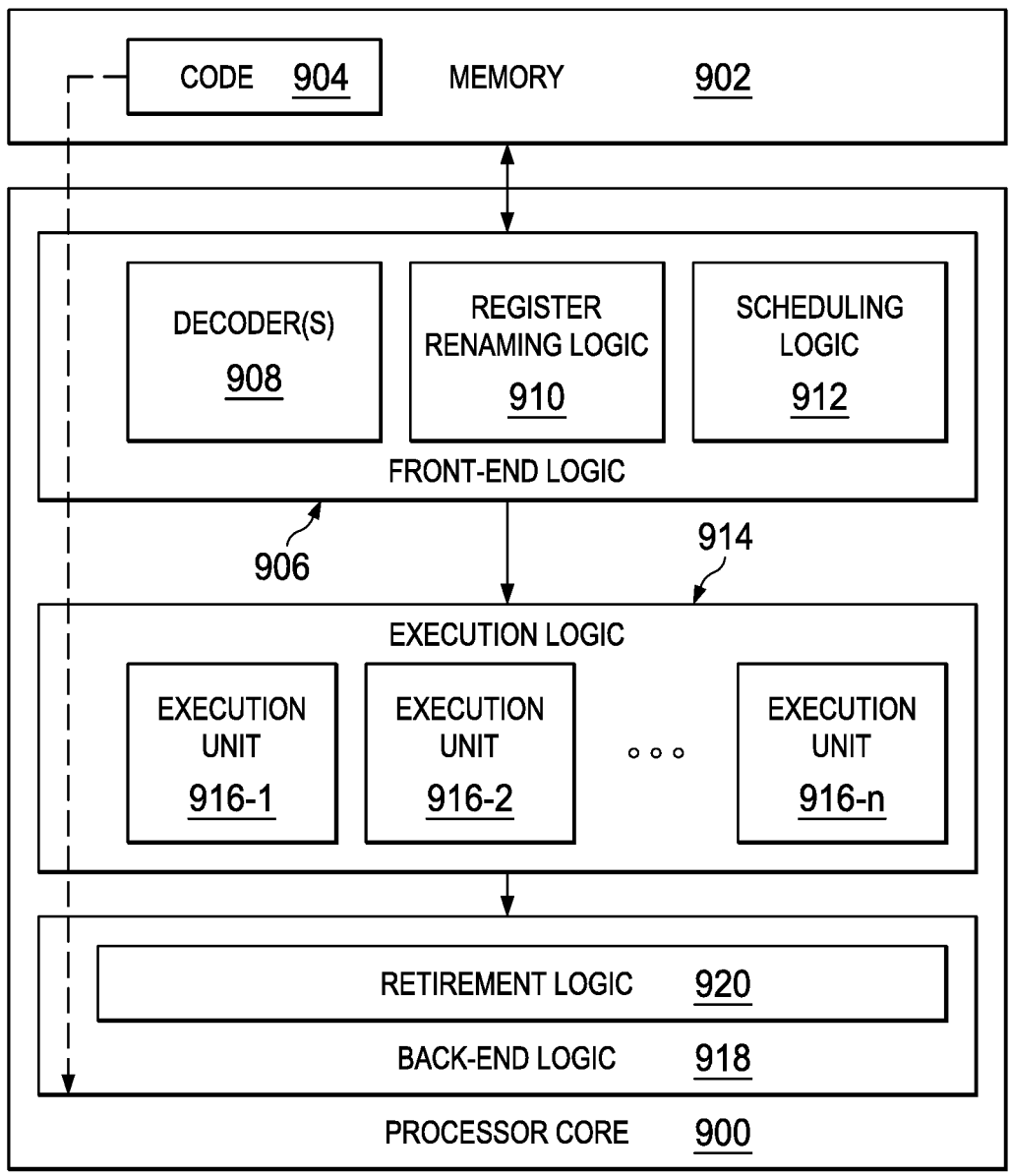
FIG. 9 is a block diagram illustrating an example processor core in accordance with an embodiment.

FIG. 9 illustrates a processor core 900 according to an embodiment. Processor core 900 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 974a, 974b, 984a, and 984b shown and described with reference to processors 970 and 980 of FIG. 9. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 4-6) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to determine that a secure domain has been created on a device, wherein keys are required to access the secure domain, obtain the keys that are required to access the secure domain from a network element, and encrypt the keys and store the encrypted keys on the device.

In Example C2, the subject matter of Example C1 can optionally include where only the secure domain can decrypt the encrypted keys.

In Example C3, the subject matter of any one of Examples C1-C2 can optionally include where the device is a virtual machine.

In Example C4, the subject matter of any one of Examples C1-C3 can optionally include where the instructions, when executed by the at least one processor, further cause the at least one processor to migrate the secure domain to a target device.

In Example C5, the subject matter of any one of Examples C1-C4 can optionally include where the target device is verified by a platform manager before it can receive the secure domain.

In Example C6, the subject matter of any one of Examples C1-5 can optionally include where a secure channel of communication is created between the device and the target device.

In Example C7, the subject matter of any one of Example C1-C6 can optionally include where speculative copies of unmodified evolved packet core pages are sent to the target device before suspension of the secure domain on the secure device.

In Example C8, the subject matter of any one of Examples C1-C7 can optionally include where the virtual machine that includes the secure domain is suspended and migrated to target device, along with keys to access the secure domain.

In Example A1, an apparatus can include a secure domain manager, where the secure domain manager is configured to determine that a secure domain has been created on a device, wherein keys are required to access the secure domain, obtain the keys that are required to access the secure domain from a network element, and encrypt the keys and store the encrypted keys on the device.

In Example, A2, the subject matter of Example A1 can optionally include where only the secure domain can decrypt the encrypted keys.

In Example A3, the subject matter of any one of Examples A1-A2 can optionally include where the device is a virtual machine.

In Example A4, the subject matter of any one of Examples A1-A3 can optionally include where the secure domain manger is further configured to migrate the secure domain to a target device.

In Example A5, the subject matter of any one of Examples A1-A4 can optionally include where the target device is verified by a platform manager before it can receive the secure domain.

In Example A6, the subject matter of any one of Examples A1-A5 can optionally include where a secure channel of communication is created between the device and the target device.

In Example A7, the subject matter of any one of Examples A1-A6 can optionally include where speculative copies of unmodified evolved packet core pages are sent to the target device before suspension of the secure domain on the secure device.

Example M1 is a method including determining that a secure domain has been created on a device, wherein keys are required to access the secure domain, obtaining the keys that are required to access the secure domain from a network element, and encrypting the keys and store the encrypted keys on the device.

In Example M2, the subject matter of Example M1 can optionally include where only the secure domain can decrypt the encrypted keys.

In Example M3, the subject matter of any one of the Examples M1-M2 can optionally include where the device is a virtual machine.

In Example M4, the subject matter of any one of the Examples M1-M3 can optionally include migrating the secure domain to a target device.

In Example M5, the subject matter of any one of the Examples M1-M4 can optionally include where the target device is verified by a platform manager before it can receive the secure domain.

In Example M6, the subject matter of any one of the Examples M1-M5 can optionally include where a secure channel of communication is created between the device and the target device.

In Example M7, the subject matter of any one of the Examples M1-M6 can optionally include where speculative copies of unmodified evolved packet core pages are sent to the target device before suspension of the secure domain on the secure device.

Example S1 is a system for migrating a secure domain, the system including a secure domain manager, where the secure domain manager is configured to determine that a secure domain has been created on a device, wherein keys are required to access the secure domain, obtain the keys that are required to access the secure domain from a network element, encrypt the keys and store the encrypted keys on the device, and migrate the secure domain to a target device.

In Example S2, the subject matter of Example S1 can optionally include where the device is a virtual machine and the target device is verified by a platform manager before it can receive the secure domain.

In Example S3, the subject matter of any of the Examples S1-S2 can optionally include where a secure channel of communication is created between the device and the target device and speculative copies of unmodified evolved packet core pages are sent to the target device before suspension of the secure domain on the secure device.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, causes the at least one processor to:
   determine that a secure domain has been created on a device in a cloud network, wherein keys are required to access the secure domain, wherein the device is a virtual machine;
   obtain the keys that are required to access the secure domain from a network element;
   encrypt the keys and store the encrypted keys on the device; and
   migrate the secure domain to a target device, wherein copies of unmodified evolved packet core pages are sent to the target device before suspension of the secure domain on the device.

2. The at least one non-transitory machine readable medium of claim 1, further comprising one or more instructions that when executed by the at least one processor, cause the at least one processor to:
   ensure that only the secure domain can decrypt the encrypted keys.

3. The at least one non-transitory machine readable medium of claim 1, further comprising one or more instructions that when executed by the at least one processor, cause the at least one processor to:
   migrate the secure domain to a target device.

4. The at least one non-transitory machine readable medium of claim 3, wherein the target device is verified by a platform manager before it can receive the secure domain.

5. The at least one non-transitory machine readable medium of claim 3, further comprising one or more instructions that when executed by the at least one processor, cause the at least one processor to:
   create a secure channel of communication between the device and the target device.

6. The at least one non-transitory machine readable medium of claim 1, further comprising one or more instructions that when executed by the at least one processor, cause the at least one processor to:
   suspend and migrate the virtual machine that includes the secure domain to the target device, along with the keys to access the secure domain.

7. An apparatus comprising:
   a secure domain manager; and
   at least one hardware processor, wherein the secure domain manager is configured to cause the at least one hardware processor to:
      determine that a secure domain has been created on a device, wherein keys are required to access the secure domain, wherein the device is a virtual machine;

obtain the keys that are required to access the secure domain from a network element;
encrypt the keys and store the encrypted keys on the device; and
migrate the secure domain to a target device, wherein copies of unmodified evolved packet core pages are sent to the target device before suspension of the secure domain on the device.

8. The apparatus of claim 7, wherein the secure domain manager is further configured to cause the at least one hardware processor to ensure that only the secure domain can decrypt the encrypted keys.

9. The apparatus of claim 7, wherein the secure domain manager is further configured to cause the at least one hardware processor to verify the target device before it can receive the secure domain.

10. The apparatus of claim 7, wherein the secure domain manager is further configured to cause the at least one hardware processor to create a secure channel of communication between the device and the target device.

11. A method comprising:
determining that a secure domain has been created on a device, wherein keys are required to access the secure domain, wherein the device is a virtual machine;
obtaining the keys that are required to access the secure domain from a network element;
encrypting the keys;
storing the encrypted keys on the device; and
migrating the secure domain to a target device, wherein copies of unmodified evolved packet core pages are sent to the target device before suspension of the secure domain on the device.

12. The method of claim 11, wherein only the secure domain can decrypt the encrypted keys.

13. The method of claim 11, further comprising:
verifying the target device before it can receive the secure domain.

14. The method of claim 11, further comprising:
creating a secure channel of communication between the device and the target device.

15. A system for migrating a secure domain, the system comprising:
at least one hardware processor; and
a secure domain manager, wherein the secure domain manager is configured to cause the at least one hardware processor to:
determine that a secure domain has been created on a device, wherein keys are required to access the secure domain, wherein the device is a virtual machine;
obtain the keys that are required to access the secure domain from a network element;
encrypt the keys and store the encrypted keys on the device; and
migrate the secure domain to a target device, wherein copies of unmodified evolved packet core pages are sent to the target device before suspension of the secure domain on the device.

16. The system of claim 15, further comprising:
a platform manager, wherein the platform manager is configured to cause the at least one hardware processor to verify the target device before it can receive the secure domain.

17. The system of claim 15, wherein the secure domain manager is further configured to cause at least one hardware processor to:
create a secure channel of communication between the device and the target device.

* * * * *